US012475508B2

(12) United States Patent
Kumar et al.

(10) Patent No.: US 12,475,508 B2
(45) Date of Patent: Nov. 18, 2025

(54) CLOUD RESOURCES ALLOCATION SYSTEM

(71) Applicant: Capital One Services, LLC, McLean, VA (US)

(72) Inventors: Ashish Kumar, McLean, VA (US); Kishan Patel, Arlington, VA (US); Travis Hughes, Fredericksburg, VA (US); Mathew Verghese, Great Falls, VA (US); Saugata Mondal, Falls Church, VA (US); Pradeep Khandelwal, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 584 days.

(21) Appl. No.: 17/003,412

(22) Filed: Aug. 26, 2020

(65) Prior Publication Data

US 2022/0067607 A1 Mar. 3, 2022

(51) Int. Cl.
*G06Q 30/08* (2012.01)
*G06F 9/50* (2006.01)
(Continued)

(52) U.S. Cl.
CPC ........... *G06Q 30/08* (2013.01); *G06F 9/5072* (2013.01); *G06F 9/5077* (2013.01);
(Continued)

(58) Field of Classification Search
None
See application file for complete search history.

(56) References Cited

U.S. PATENT DOCUMENTS 9,032,077 B1 * 5/2015 Klein .................. H04L 43/0894
712/30
9,154,589 B1 * 10/2015 Klein .................... H04L 41/083
(Continued)

FOREIGN PATENT DOCUMENTS

CN 108282527 A * 7/2018 ............. G06F 21/32
WO 2019113216 A1 6/2019

OTHER PUBLICATIONS

Teng et al. "Resource allocation and scheduling models for cloud Computing" (2011) (https://tel.archives-ouvertes.fr/tel-00659303/document) (Year: 2011).*

*Primary Examiner* — Sujay Koneru
(74) *Attorney, Agent, or Firm* — Sterne, Kessler, Goldstein & Fox P.L.L.C.

(57) ABSTRACT

Disclosed herein are various embodiments for a cloud resources allocation system. An embodiment operates by determining that an application requests a plurality of instances to execute across one or more processors of a cloud services platform. One or more spare instances are requested to fulfill at least a portion of the plurality of instances, and an allocation of at least a subset of the requested one or more spare instances is received. An execution of the application is directed to the allocated subset of the one or more spare instances, including a first spare instance. A notification is received from the cloud services platform that the first spare instance is to be reallocated to a different process. A subsequent execution of the application is redirected to an on demand instance of the cloud services platform.

22 Claims, 4 Drawing Sheets (51) Int. Cl.
*G06Q 10/0631* (2023.01)
*G06Q 20/08* (2012.01)
*H04L 47/70* (2022.01)
*H04L 67/10* (2022.01)

(52) U.S. Cl.
CPC . *G06Q 10/06312* (2013.01); *G06Q 10/06315* (2013.01); *G06Q 20/085* (2013.01); *H04L 47/70* (2013.01); *H04L 67/10* (2013.01)

(56) References Cited

U.S. PATENT DOCUMENTS

| | | | | |
|---|---|---|---|---|
| 9,471,391 | B1* | 10/2016 | Abramson | G06F 16/285 |
| 9,774,489 | B1* | 9/2017 | Gupta | H04L 41/00 |
| 9,864,636 | B1* | 1/2018 | Patel | G06F 9/5061 |
| 9,948,514 | B2* | 4/2018 | Kansal | H04L 67/1085 |
| 10,289,453 | B1* | 5/2019 | Wei | H04L 67/10 |
| 10,459,757 | B1 | 10/2019 | Srinivasan et al. | |
| 10,528,367 | B1 | 1/2020 | Liu et al. | |
| 10,686,677 | B1* | 6/2020 | Ward, Jr. | H04L 47/788 |
| 10,761,875 | B1* | 9/2020 | Burgin | G06F 9/505 |
| 10,846,788 | B1* | 11/2020 | Klein | H04L 47/783 |
| 10,942,795 | B1* | 3/2021 | Yanacek | G06F 9/5066 |
| 11,093,139 | B1* | 8/2021 | Karr | G06F 3/0685 |
| 2002/0097680 | A1* | 7/2002 | Liu | H04Q 3/66 370/386 |
| 2013/0263117 | A1* | 10/2013 | Konik | G06F 9/45558 718/1 |
| 2013/0346618 | A1* | 12/2013 | Holkkola | H04L 61/2007 709/226 |
| 2014/0304713 | A1* | 10/2014 | Olsson | G06F 9/4881 718/106 |
| 2015/0026517 | A1* | 1/2015 | Ben Romdhane | H04L 67/10 714/15 |
| 2015/0169339 | A1* | 6/2015 | Anderson | G06F 11/3419 718/1 |
| 2015/0248418 | A1* | 9/2015 | Bhardwaj | H04L 12/14 707/694 |
| 2015/0312243 | A1* | 10/2015 | Ponsford | G06F 21/6227 713/193 |
| 2015/0372881 | A1* | 12/2015 | Bellomo | H04L 41/5054 709/226 |
| 2015/0381425 | A1* | 12/2015 | Kansal | H04L 41/0896 709/224 |
| 2016/0274949 | A1* | 9/2016 | Cao | G06F 8/61 |
| 2017/0279826 | A1* | 9/2017 | Mohanty | H04L 67/1004 |
| 2018/0102984 | A1* | 4/2018 | Dettori | H04L 47/82 |
| 2018/0255137 | A1* | 9/2018 | Hu | H04L 67/1097 |
| 2018/0260251 | A1* | 9/2018 | Beveridge | G06F 9/5027 |
| 2018/0316552 | A1* | 11/2018 | Subramani Nadar | H04L 67/10 |
| 2018/0351876 | A1* | 12/2018 | Ren | H04L 47/808 |
| 2019/0068622 | A1 | 2/2019 | Lin et al. | |
| 2019/0104022 | A1* | 4/2019 | Power | H04L 41/0806 |
| 2019/0340033 | A1* | 11/2019 | Ganteaume | G10L 15/26 |
| 2020/0380254 | A1* | 12/2020 | Zeng | G06K 9/6247 |

* cited by examiner

CLOUD RESOURCES ALLOCATION SYSTEM

BACKGROUND

Cloud computing provides computer system resources to clients on an on-demand basis without direct or active management by the client or user. Two of the most commonly provided cloud computing resources are data storage (e.g., cloud storage) and computing power. One of the advantages of using cloud computing resources is that it enables clients to more easily adjust to fluctuating demands by increasing or decreasing their requests for cloud services.

Clients with known computing needs may subscribe to cloud services to secure computing resources to meet their needs. The cloud service provider may provide uptime or availability guarantees that ensure that the subscribed-to instances (of cloud resources) will be available to the client anytime day or night.

However, clients often do not use all of the resources that are guaranteed by their service level. Also, the cloud service provider after satisfying all their known client needs, may have spare or excess capacity available. The cloud service provider may make these spare instances (e.g., excess computing capacity) available to clients without the uptime or availability guarantees of the subscribed to cloud services.

Clients may bid on or request these spare instances, which may be granted by a cloud service provider for an indeterminate period of time, and which, unlike subscribed-to instances, may be revoked by the cloud service provider at any time with limited or no notice. If, however, this excess computing resource capacity is not allocated to a client and sits idle, it costs the cloud service provider money for any length of time it goes unused. Meanwhile there are clients or potential clients seeking additional computing resources.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing a cloud resources allocation system.

Figure 1:
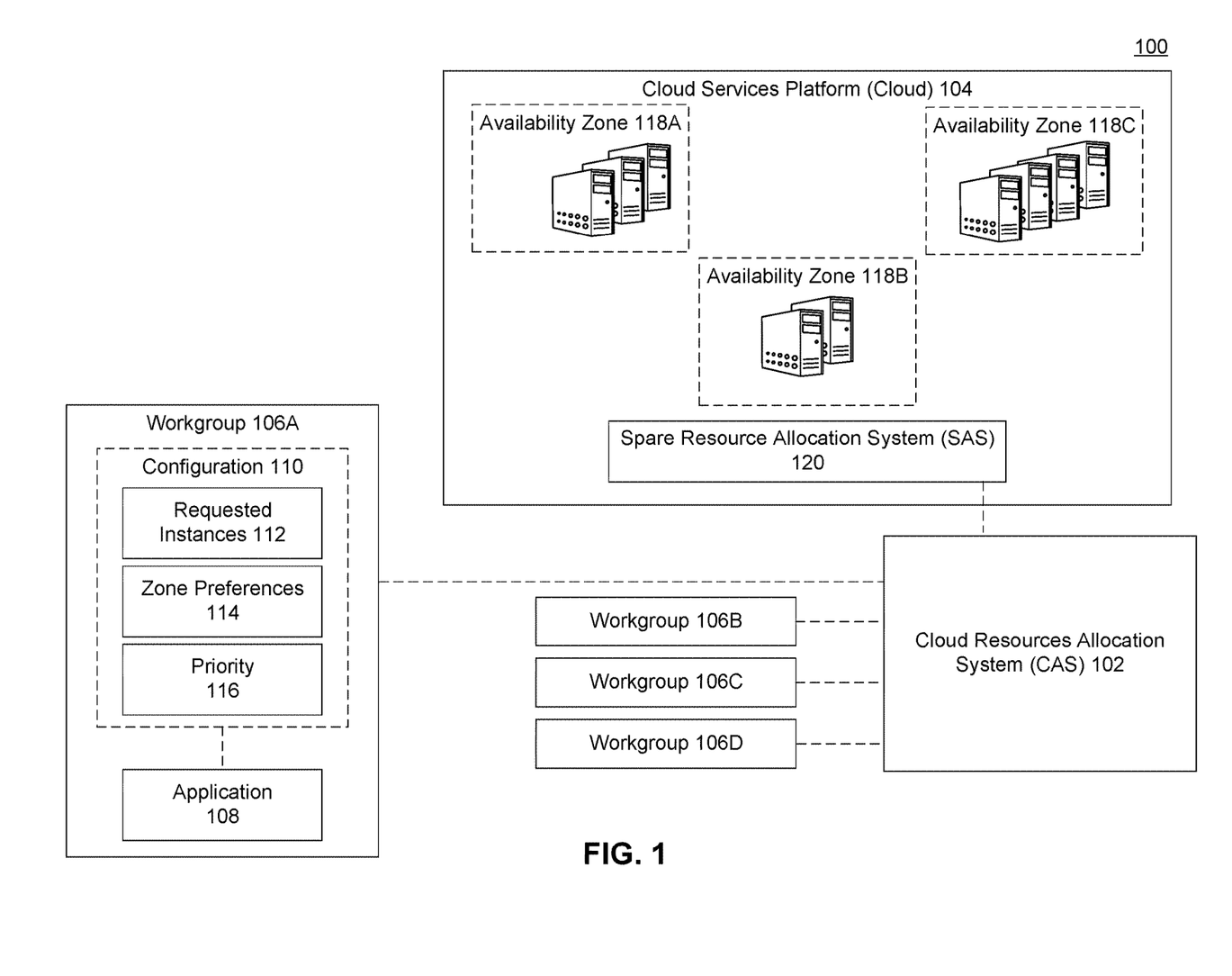
FIG. 1 is a block diagram illustrating example functionality for providing a cloud resources allocation system, according to some embodiments.

FIG. 1 is a block diagram 100 illustrating example functionality for providing a cloud resources allocation system (CAS) 102, according to some embodiments. Cloud service providers acquire and maintain computing resources which they make available to their clients based on their clients' requests. Clients who know they require certain computing resources may reserve a portion of the cloud computing services in what is referred to as an on demand request or allocation.

With on demand allocations, the cloud service provider may provide various service guarantees for the reserved computing capacity or instances. For example, a cloud service provider may provide availability or uptime guarantees that indicate that the instances will always be available to the client when needed.

However, cloud service providers often acquire, maintain, and have available more computing resources or computing capacity for allocation than is required by or has been reserved by their clients at any given time. This excess or unused computing resource capacity often sits idle and costs the cloud service provider money to maintain for any length of time the capacity goes unused. Meanwhile there are clients or potential clients who are seeking additional computing resources, who cannot afford or do not need the service guarantees of on demand reservations.

The cloud allocation system (CAS) 102 may help maximize the resource usage and profitability of a cloud services provider (cloud) 104, while satisfying the computing resource needs of clients, thus increasing overall computing resource utilization and throughput. Additionally, cloud 104 may increase or maximize profitability by assigning spare computing capacity to clients at a lower cost than on demand allocation, through what is referred to as spare allocation.

Cloud 104 may be an example cloud service provider that provides distributed computing capacity (e.g., memory, data storage, CPU time, bandwidth, etc.) to customers. In an embodiment, cloud 104 may make available computing resources (e.g., such as virtual machine computing instances) for reservation through on demand allocation with service guarantees as described above. In an embodiment, cloud 104 may charge customers or clients on a pay-as-you-go basis, such that a customer only pays for what they actually use. Cloud 104 may also make available any leftover, excess, unused, unallocated, or spare computing capacity through spare allocations during those times when cloud 104 has excess computing capacity.

In an embodiment, spare allocations may not include any service guarantees or may include service guarantees that are more limited relative to on demand allocations. For example, while cloud 104 may provide an availability guarantee for on demand allocations, spare allocations may include no such guarantee and may be deallocated from a customer at any time with no or limited notice. For example, cloud 104 may inform a client that their allocation or instance will be terminated within two minutes. As such, cloud 104 may offer spare allocations at a discounted price relative to on demand allocations.

An example cloud services platform 104 may include AMAZON WEB SERVICES (AWS) which makes available spare instances, referred to as "spot instances". The spot instances may enable users to rent virtual computers on which to run their own computing applications. A virtual machine on cloud 104 may be referred to as an "instance." A client or user may upload or run any software they desire on a cloud instance. In an embodiment, a user may create, launch, and terminate server instances as needed, and may only pay for the active servers. In an embodiment, cloud 104 may provide users with control over geographic locations of instances that allow for latency optimization. Other example of cloud service platforms 104 include, but are not limited to MICROSOFT AZURE, GOOGLE CLOUD PLATFORM, VMWARE, IBM CLOUD SERVICES, RACKSPACE, and ADOBE CREATIVE CLOUD.

CAS 102 provides functionality that enables greater usage or allocation of excess or unused computing resources of cloud 104. CAS 102 may help match customers or potential customers, referred to herein as workgroups 106A-D, to the excess computing or resource capacity of cloud 104 that may be offered as spare allocations. CAS 102 may maximize the usage of the available resources of cloud 104 while satisfying the needs of workgroups 106A-D. Without CAS 102, cloud 104 may have computing resources going unused, and sitting idle, costing cloud 104 money while the computing needs or requirements of workgroups 106A-D may remain unsatisfied.

As referenced above, cloud 104 may sell or otherwise make available computing resources or allocations as instances. A cloud computing instance may be a virtual server instance that is allocated to a particular workgroup 106A-D to execute an application 108. Application 108 may be any computing program or computer application that is configured to operate on one or more instances of cloud 104. As referenced above, a client or CAS 102 (on behalf of one or more clients or workgroups 106A-D) may request an on demand instance or a spare instance from cloud 104 on which to execute an application 108.

In an embodiment, application 108 may be a stateless application. An example stateless application may be a representational state transfer (REST) application programming interface (API). In an embodiment, the stateless application 108 may receive a request from a client to perform some actions (which may include modifying or saving data), and returning a response or result from the actions. In an embodiment, application 108 may include a set of modules, functions, apps, or applications 108 that operate together to provide a set of functionality to one or more users or systems.

In an embodiment, each workgroup 106A-D may set its own configuration 110 for each application 108 they want to execute using one or more cloud instances (e.g., on demand or spare). For simplicity, only one application 108 and corresponding configuration 110 for a single workgroup 106A is illustrated, however, it is understood that each workgroup 106A-D may include its own configuration information 110 and application 108 as described herein. In an embodiment, a workgroup 106A may include multiple applications and requested instances 112 or configurations 110 for each application 108.

In an embodiment, configuration 110 may include a variety of information such as requested instances 112, zone preferences 114, and priority 116 information for a particular application 108. In an embodiment, CAS 102 may request, allocate, bid on, and/or assign instances from cloud 104 to a particular workgroup 106A-D based on configuration 110 information. In an embodiment, configuration 110 may be used by cloud 104 to allocate or set up virtual servers to be used with application 108.

Requested instances 112 may include how many instances of cloud 104 are requested or required to execute application 108 and make it available to users or clients of the application. Zone preferences 114 may include any preference information regarding particular availability zones 118A-C of cloud 104 from which to request or allocate instances.

Priority 116 may indicate how many requested instances 112 should be on demand instances, or may indicate a general priority indicator of application 108 (e.g., high, medium, low). In an embodiment, as priority 116 increases, the number or proportion of on demand instances (relative to spare instances) used to fulfill requested instances 112 may also increase. In another embodiment, priority 116 may be a flag, Boolean value, or binary value that indicates whether a particular workgroup 106A-D wants to opt in to CAS 102 and request spare instances be used for one or more the requested instances 112. Then, for example, if the flag of priority 116 is set, CAS 102 may request spare instances or any or all of the requested instances 112.

In an embodiment, a high priority 116 application 108, such as a customer facing or production line application, may include only, primarily, or the majority of on demand instances because an organization or workgroup 106A may not want to risk downtime and customer dissatisfaction that may result from allocating a spare instance. An example, of a lower priority 116 application 108 may include an application that is under development or in quality assurance testing, for which a temporary outage may be more acceptable.

In an embodiment, cloud 104 may be organized into different availability zones 118A-C. Availability zones 118A-C may include groups of servers or other computing resources that enable cloud 104 to serve various workgroups 106A-D. In an embodiment, cloud 104 may have geographically distributed availability zones 118A-C. As illustrated, each availability zone 118A-C may have its own processing capacity and available instances for both on demand and spare allocation.

In an embodiment, configuration 110 may include zone preferences 114 that indicate which availability zones 118A-C are required or preferred by a particular workgroup 106A-D. Then, for example, CAS 102 may request or allocate spare instances based on a particular workgroup's 106A-D zone preferences setting 114. In an embodiment, zone preferences 114 may be an optional value, or may include multiple different availability zones 118A-C, which may or may not be ranked according to a workgroup 106A preference.

In an embodiment, CAS 102 may collect configuration information 110 from the various workgroups 106A-D, and request or allocate instances from cloud 104 through a spare resource allocation system (SAS) 120. SAS 120 may be a system of cloud 104 that receives bids on or requests for spare instances and assigns those spare instances to various clients, including CAS 102. In an embodiment, SAS 120 may also manage the instances, and send notifications to CAS 102 when a spare instances is being terminated, cancelled, revoked, deallocated, reallocated, or reassigned.

Figure 2:
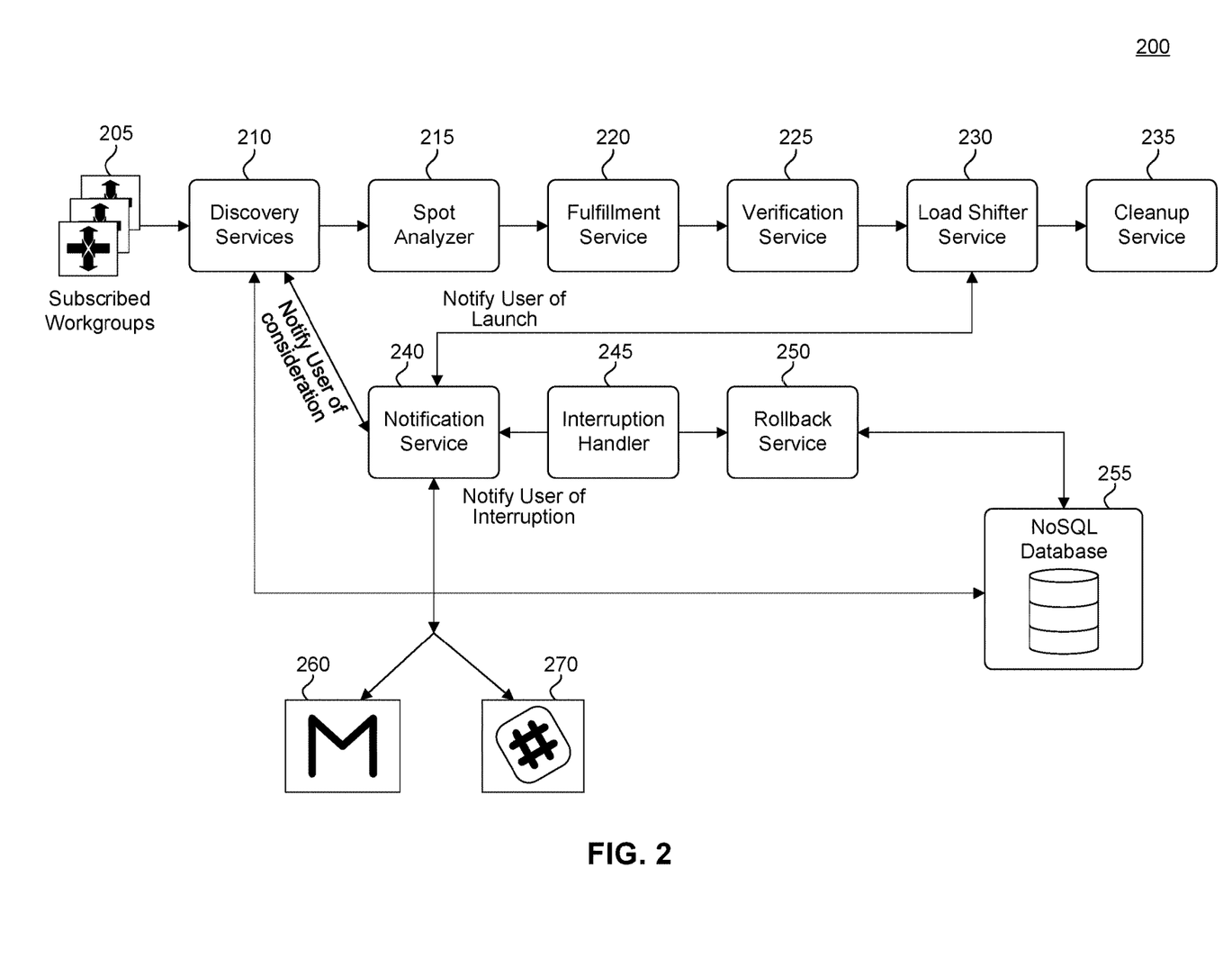
FIG. 2 is a flowchart illustrating example operations related to allocating cloud resources by a cloud resources allocation system, according to some embodiments.

FIG. 2 is a flowchart 200 illustrating example operations related to allocating cloud resources by a cloud resources allocation system 102, according to some embodiments.

At 205, the various workgroups 106A-106D may set their configuration information 110. The configuration information 110 may indicate whether or not the particular workgroup is opting in or subscribing to the CAS 102 (if they want to request spare allocations) based on priority 116, how many allocations are being requested 112, and any zone preferences or requirements 114.

In an embodiment, the requested instances 112 may include a minimum and maximum number of requested instances, and a rule for increasing the number of allocated instances between the minimum and the maximum number. For example, requested instances 112 may indicate a minimum of 2 and a maximum of 6, and when processing reaches 70% of its threshold, then a new instance should be allocated, up to 6 concurrent or simultaneous instances.

In an embodiment, configuration 110 may also include a rule for dropping an allocated instance down to at least 2. For example, when processing on any instance drops below 30% of its capacity, fewer instances may be used, down to 2. In an embodiment, CAS 102 may monitor usage of the allocated systems of cloud 104 to determine when to allocate or deallocate spare instances.

At 210, CAS 102 may execute a discovery service. CAS 102 may identify which workgroups 106A-D are subscribed to CAS 102 based on their configuration information 110. For example, Discovery service may scan the configurations 110 of the various workgroups 106A-D to determine which ones are opting in to using spare instances in addition or alternatively to on demand instances based on the priority 116 indication.

Based on the requested instances 112, CAS 102 may determine how many instances each workgroup 106A-D is requesting, and zone preferences 114 may indicate any existing zone preferences. In an embodiment, configuration 110 may also indicate how many on demand instances have currently been reserved on cloud by a particular workgroup 106A.

In an embodiment, the applications and functionality described herein (e.g., discovery 210, analyzer 215, fulfillment 220, verification 225, load shifter 230, cleanup 235, notification 240, interruption handler 245, and rollback 250) may be Lambda functions of CAS 102 that destroy or kill themselves after execution without retaining data. In an embodiment, Lambda functions may be event driven code that terminates after the completion of processing after the detection of an event.

The Lambda functions however may store or retrieve data from a NoSQL (non-structured query language) database 255. For example, discovery service 210 may store the detected information about which workgroups 106A-D are opting in and how many instances 112 they are requesting in NoSQL database 255. This information may then be accessible to any of the other Lambda functions. In an embodiment, NoSQL database 255 may not be a relational database, but just a quick storage and access system that may available to clients on cloud 104. In another embodiment, an SQL, relational, columnar or other database or storage and retrieval system may be used in lieu of a NoSQL database 255.

At 240, a notification service may retrieve the discovery information from NoSQL database 255 and notify users or workgroups 106A-D that their spare instance requests are being processed. In an embodiment, notification service 240 may provide this and other notifications or communications via email 260 or social media 270, or other forms of electronic communication (e.g., phone call, voicemail, etc.).

At 215, a spot analyzer may retrieve the stored configuration information 110 from the NoSQL database 255 and identify the how many spare instances and their costs in the various applicable availability zones 118A-C. In an embodiment, spot analyzer may identify the cheapest spare instance cost or the availability zone 118A-C with the cheapest spare instance cost and store this information in NoSQL database 255.

At 220, a fulfillment service may retrieve the spare instance cost from the NoSQL database 255 and submit a bid or request for one or more spare instances to SAS 120. The various bids on the spare instances, such as transaction numbers or requests, may be stored in NoSQL database 255.

At 225, a verification service may monitor the bids on spare instances from SAS 120 to identify which bids were successful. For example, the verification service may monitor SAS 102 and when a status of a bid changes from pending to fulfilling, active, or allocation, the verification service may record that as a success bid in NoSQL database 255. In an embodiment, unsuccessful bids may or may not be recorded and no retry may be performed by CAS 102 until the next execution of the discovery service.

At 230, a load shifter service may shift an on-demand or non-executing load for application 108 to the spare instances that were determined to be active or allocated at 225. In an embodiment, lower priority applications 108 may be shifted from on-demand to spare instances first, while higher priority applications 108 are allowed to remain operating on on-demand instances in case there are not enough spare instances to satisfy all of the resource needs for all of the applications 108.

At 235, a cleanup service may stop any ongoing on demand instances so that the resources are freed and the workgroups 106A-D are not charged for unused services. For example, the cleanup service may send a message to cloud 104 to indicate the deallocation of previously used on-demand instances.

At 240, a notification service may inform a user via email 260 or social media 270 or using some other communications channel as to the current status of any spare requests.

At 245, an interruption handler may receive an interruption request on a particular spare instance which has been allocated to one of the workgroups 106A-D. The interruption request may indicate that there is a finite amount of time before cloud 104 deallocates the spare instance, and provides it to another service or application. For example, the interruption may indicate that the spare instance will be deallocated or reallocated in 60 seconds, 90 seconds, or 120 seconds. This information may be stored in NoSQL database 255.

At 250, a rollback service may identify the expiring spare instances from NoSQL database 255, and may start the execution of the corresponding application 108 on any on demand instances that have been previously allocated but that are unused. As noted above, the applications 108 may be stateless so that there is no need for CAS 102 to transfer a state from a spare instance to an on-demand instance, or vice versa.

In an embodiment, an expiring spare instance may be a spare instance for which an interruption or termination notice has been received. The cloud service provider sends the interruption or termination a short interval (perhaps 1-5 minutes) before the spare instance will become unavailable. If no on demand instances are available, notification service 240 may notify a user in the workgroup 106A who may indicate (or may have previously indicated with configuration 11) whether a new spare or on demand instance should be requested.

Figure 3:
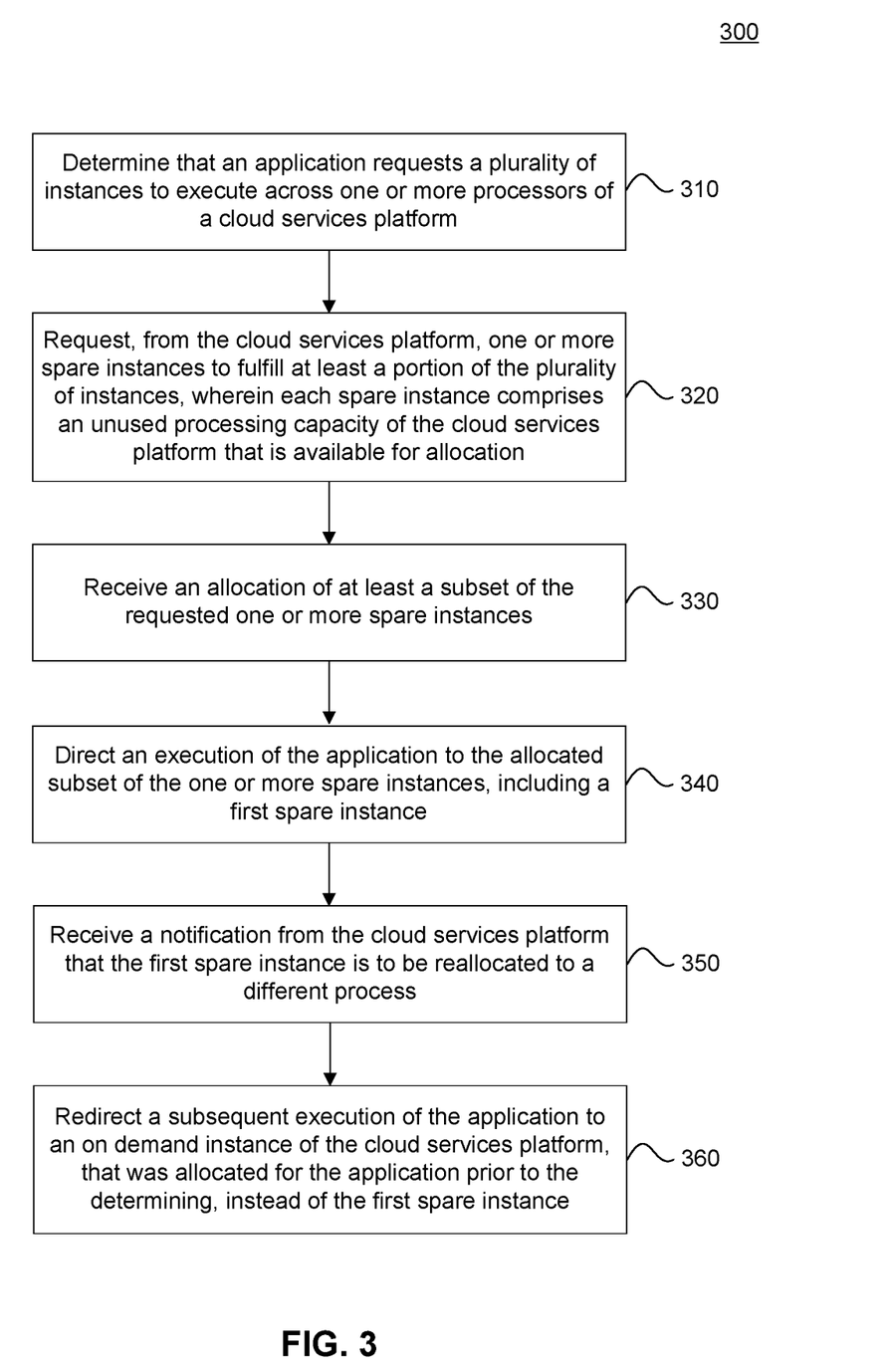
FIG. 3 is a flowchart illustrating example operations of a cloud resources allocation system, according to some embodiments.

FIG. 3 is a flowchart 300 illustrating example operations of a cloud resources allocation system (CAS) 102, according to some embodiments. Method 300 can be performed by processing logic that can comprise hardware (e.g., circuitry, dedicated logic, programmable logic, microcode, etc.), software (e.g., instructions executing on a processing device), or a combination thereof. For example, various steps in method 300 may be performed using one or application programming interfaces (APIs) operating on one or more processing devices. It is to be appreciated that not all steps may be needed to perform the disclosure provided herein. Further, some of the steps may be performed simultaneously, or in a different order than shown in FIG. 3, as will be understood by a person of ordinary skill in the art. Method 300 shall be described with reference to FIG. 1. However, method 300 is not limited to the example embodiments.

In 310, it is determined that an application requests a plurality of instances to execute across one or more processors of a cloud services platform. For example, CAS 102 may determine how many instances are requested for a particular application 108 from requested instances 112.

In 320, one or more spare instances are requested from the cloud services platform to fulfill at least a portion of the plurality of instances, wherein each spare instance comprises an unused processing capacity of the cloud services platform that is available for allocation such that the cloud services platform reserves a right to reallocate the spare instance. For example, CAS 102 may bid on and request spare instances (e.g., computing time, computing power, virtual machine instantiations, etc.) from cloud 104. Cloud 104 may make available both on demand instances for reservation, and spare instances when there is additional unused computing capacity.

In 330, an allocation of at least a subset of the requested one or more spare instances is received. For example, cloud 104 may notify CAS 102 how or which spare instances are active and allocated to CAS 102, or the various applications 108.

In 340, an execution of the application is directed to the allocated subset of the one or more spare instances, including a first spare instance. For example, CAS 102 may direct the executions of the applications 108 to the active spare instances. In an embodiment, this may include deactivating, pausing, or stopping an execution of an application (which may be stateless) on an on demand instance, and switching it to a spare instance. Other executions may be started on the allocated or active spare instances.

In 350, a notification from the cloud services platform that the first spare instance is to be reallocated to a different process is received. For example, CAS 102 may receive a notification or interrupt from cloud 104 that one or more of the previously allocated spare instances are going to be deallocated from CAS 102 within a specified time interval.

In 360, a subsequent execution of the application is redirected to an on demand instance of the cloud services platform that was allocated for the application prior to the determining, instead of the first spare instance. For example, CAS 102 may begin or redirect subsequent calls to an application 108 to execute on a different and available on demand instance or spare instance. For example, a call to execute an application 104 may automatically be directed to whatever instance (spare or on-demand) on which it is executing or made available through cloud 104. If no instances are available, then the application 108 may not be executed, a new on demand instance may be requested, or a new spare instance may be requested after the next execution of a discovery service (e.g., 210).

In an embodiment, lower priority applications 108 may be assigned spare instances, and may be allowed to sit idle (if not immediately required) until another spare instance becomes available. If the lower priority application 108 is required prior to another spare instance becoming available and being allocated, then the lower priority application 108 may use an on-demand instance, which may incur a higher usage cost (relative to waiting for the spare instance). In an embodiment, after a threshold period of time, a lower priority application 108 may be assigned to an on-demand instance by CAS 102 if no spare instance has become available prior to reaching the threshold.

Figure 4:
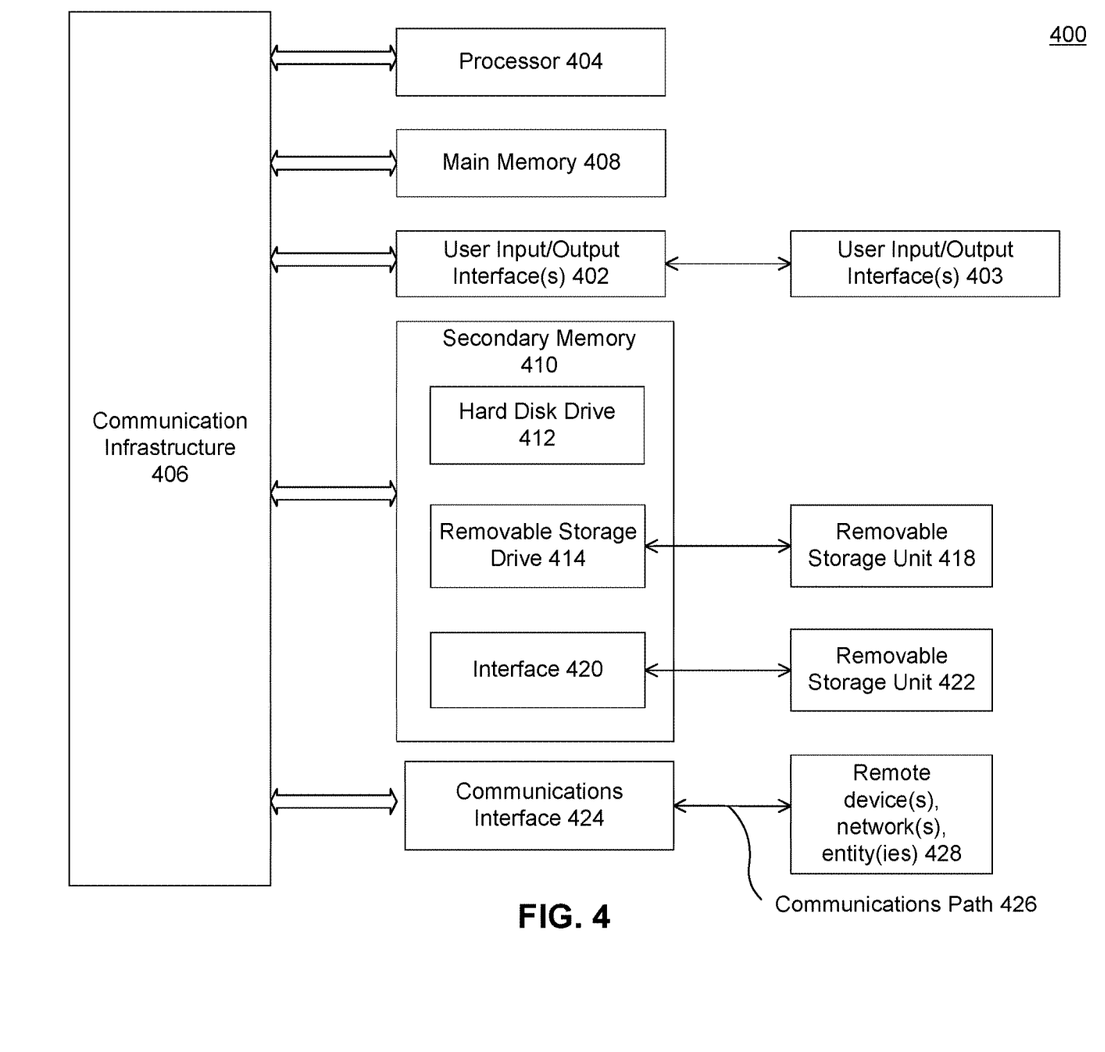
FIG. 4 is example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include customer input/output device(s) 403, such as monitors, keyboards, pointing devices, etc., which may communicate with communication infrastructure 406 through customer input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424.

Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for efficient utilization of cloud computing services, comprising:

receiving a request from an application associated with a client for a plurality of instances to execute across one or more processors of a cloud services platform;

requesting, from the cloud services platform, one or more spare instances to fulfill at least a portion of the plurality of instances between a minimum and a maximum number of spare instances based on a first rule that relates to increasing an allocation of the one or more spare instances between the minimum and the maximum number of spare instances and a second rule that relates to decreasing the allocation of the one or more spare instances between the minimum and the maximum number of spare instances, wherein both the first rule and the second rule are based on a processing capacity of any allocated spare instances, wherein the one or more spare instances comprise an unused processing capacity of the cloud services platform that is available for allocation such that the cloud services platform reserves a right to reallocate the one or more spare instances;

receiving an allocation of at least a subset of the requested one or more spare instances;

directing an execution of the application to the allocated subset of the one or more spare instances, including a first spare instance;

receiving a notification from the cloud services platform indicating that the first spare instance executing the application is to be reallocated to a different process at an end of a timeout period specified in the notification; and redirecting a subsequent execution of the application to an on demand instance of the cloud services platform at the end of the timeout period specified in the notification, that was allocated for the application prior to the receiving the request, instead of the first spare instance.

2. The method of claim 1, wherein the cloud services platform charges a greater price for executing the application using the on demand instance than using the first spare instance, wherein the on demand instance includes service guarantee from the cloud services platform that is not provided with the first spare instance.

3. The method of claim 2, wherein the requesting comprises:

identifying, by a processor, a cost of the first spare instance;

automatically submitting, by the processor, a bid for the first spare instance based on the cost; and determining, by the processor, that the bid was accepted and the first spare instance was allocated for use by the application by the cloud services platform.

4. The method of claim 3, wherein the identifying the cost comprises:

determining that the cloud services platform includes a plurality of different availability zones, wherein each availability zone includes spare instance capacity for a particular price;

identifying a cost of the one or more spare instances in each availability zone; and selecting, by the processor, the first spare instance in the availability zone with a lowest cost, wherein the bid is submitted on the selected first spare instance.

5. The method of claim 2, wherein at least one on demand instance is maintained for executing the application on the cloud services platform.

6. The method of claim 5, wherein the requesting comprises:

identifying a cost of the first spare instance;

submitting a bid for the first spare instance based on the cost;

determining by the processor, that the bid was rejected; and executing the application on the at least one maintained on demand instance until a subsequent spare instance bid is accepted.

7. The method of claim 1, wherein the application is stateless.

8. The method of claim 1, wherein the cloud services platform is configured to monitor the processing capacity of the one or more spare instances allocated to the client in accordance with both the first rule and the second rule received from the client.

9. The method of claim 1, wherein a response from the client is received responsive to the notification and prior to the redirecting indicating the on demand instance will be used or requesting a new spare instance.

10. A system for efficient utilization of cloud computing services, comprising:

a memory; and at least one processor coupled to the memory and configured to perform operations comprising:

receiving a request from an application associated with a client for a plurality of instances to execute across one or more processors of a cloud services platform;

requesting, from the cloud services platform, one or more spare instances to fulfill at least a portion of the plurality of instances between a minimum and a maximum number of spare instances based on a first rule that relates to increasing an allocation of the one or more spare instances between the minimum and the maximum number of spare instances and a second rule that relates to decreasing the allocation of the one or more spare instances between the minimum and the maximum number of spare instances, wherein both the first rule and the second rule are based on a processing capacity of any allocated spare instances, wherein the one or more spare instances comprise an unused processing capacity of the cloud services platform that is available for allocation such that the cloud services platform reserves a right to reallocate the one or more spare instances;

receiving an allocation of at least a subset of the requested one or more spare instances;

directing an execution of the application to the allocated subset of the one or more spare instances, including a first spare instance;

receiving a notification from the cloud services platform indicating that the first spare instance executing the application is to be reallocated to a different process at an end of a timeout period specified in the notification; and redirecting a subsequent execution of the application to an on demand instance of the cloud services platform at the end of the timeout period specified in the notification, that was allocated for the application prior to the determining receiving the request, instead of the first spare instance.

11. The system of claim 10, wherein the cloud services platform charges a greater price for executing the application using the on demand instance than using the first spare instance, wherein the on demand instance includes service guarantee from the cloud services platform that is not provided with the first spare instance.

12. The system of claim 11, wherein the requesting operations comprise:

identifying, by a processor, a cost of the first spare instance;

automatically submitting, by the processor, a bid for the first spare instance based on the cost; and determining, by the processor, that the bid was accepted and the first spare instance was allocated for use by the application by the cloud services platform.

13. The system of claim 12, wherein the identifying the cost operations comprise:

determining that the cloud services platform includes a plurality of different availability zones, wherein each availability zone includes spare instance capacity for a particular price;

identifying a cost of the one or more spare instances in each availability zone; and selecting, by the processor, the first spare instance in the availability zone with a lowest cost, wherein the bid is submitted on the selected first spare instance.

14. The system of claim 11, wherein at least one on demand instance is maintained for executing the application on the cloud services platform.

15. The system of claim 14, wherein the requesting operations comprise:
identifying a cost of the first spare instance;
submitting a bid for the first spare instance based on the cost;
determining by the processor, that the bid was rejected; and
executing the application on the at least one maintained on demand instance until a subsequent spare instance bid is accepted.

16. The system of claim 10, wherein the application is stateless.

17. A non-transitory computer-readable device having instructions stored thereon that, when executed by at least one computing device, cause the at least one computing device to perform operations for efficient utilization of cloud computing services, the operations comprising:
receiving a request from an application associated with a client for a plurality of instances to execute across one or more processors of a cloud services platform;
requesting, from the cloud services platform, one or more spare instances to fulfill at least a portion of the plurality of instances between a minimum and a maximum number of spare instances based on a first rule that relates to increasing an allocation of the one or more spare instances between the minimum and the maximum number of spare instances and a second rule that relates to decreasing the allocation of the one or more spare instances between the minimum and the maximum number of spare instances, wherein both the first rule and the second rule are based on a processing capacity of any allocated spare instances, wherein the one or more spare instances comprise an unused processing capacity of the cloud services platform that is available for allocation such that the cloud services platform reserves a right to reallocate the one or more spare instances;
receiving an allocation of at least a subset of the requested one or more spare instances;
directing an execution of the application to the allocated subset of the one or more spare instances, including a first spare instance;
receiving a notification from the cloud services platform indicating that the first spare instance executing the application is to be reallocated to a different process at an end of a timeout period specified in the notification; and
redirecting a subsequent execution of the application to another instance of the cloud services platform at the end of the timeout period specified in the notification.

18. The device of claim 17, wherein the another instance comprises a new spare instance based on a request to use the new spare instance as received from a user.

19. The device of claim 17, wherein the cloud services platform charges a greater price for executing the application using an on demand instance than using the first spare instance, wherein the on demand instance includes service guarantee from the cloud services platform that is not provided with the first spare instance.

20. The device of claim 19, wherein the requesting operations comprise:
identifying, by a processor, a cost of the first spare instance;
automatically submitting, by the processor, a bid for the first spare instance based on the cost; and
determining, by the processor, that the bid was accepted and the first spare instance was allocated for use by the application by the cloud services platform.

21. The device of claim 20, wherein the identifying the cost operations comprise:
determining that the cloud services platform includes a plurality of different availability zones, wherein each availability zone includes spare instance capacity for a particular price;
identifying a cost of the one or more spare instances in each availability zone; and
selecting, by the processor, the first spare instance in the availability zone with a lowest cost, wherein the bid is submitted on the selected first spare instance.

22. The device of claim 19, wherein the requesting operations comprise:
determining that at least one on demand instance is maintained for executing the application on the cloud services platform;
identifying a cost of the first spare instance;
submitting a bid for the first spare instance based on the cost;
determining by the processor, that the bid was rejected; and
executing the application on the at least one maintained on demand instance until a subsequent spare instance bid is accepted.

* * * * *